UNITED STATES PATENT OFFICE.

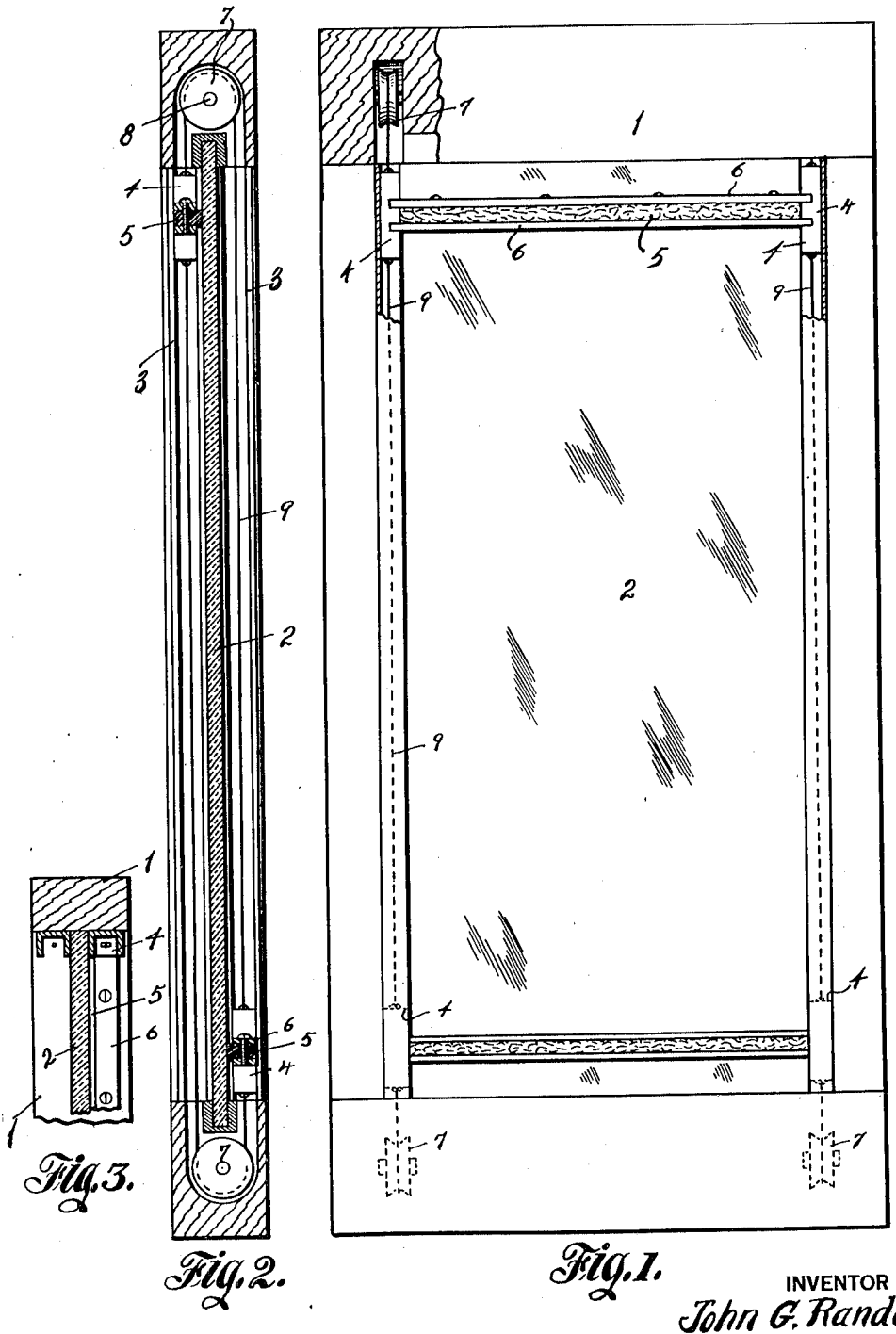

JOHN G. RANDALL, OF DALLAS, TEXAS, ASSIGNOR OF ONE-HALF TO JOHN T. SHEPHERD, OF DALLAS, TEXAS.

WINDOW WASHER AND WIPER.

1,274,445.  Specification of Letters Patent.  Patented Aug. 6, 1918.

Application filed April 30, 1917. Serial No. 165,370.

*To all whom it may concern:*

Be it known that I, JOHN G. RANDALL, a citizen of the United States of America, residing at Dallas, in the county of Dallas and State of Texas, have invented a certain new and useful Improved Form of Window Washers and Wipers, of which the following is a specification.

This invention relates to new and useful window washing devices and particularly appertains to a form of window washer which will be mounted in connection with the window frame which supports the pane or glass to be washed that same may be washed and wiped by comparatively few intermittent actions of the device.

A further object of the invention is to provide a form of window washing device which will be adaptable to be used in connection with street car, vestibule and observation windows through which it is necessary for one to observe the track while the car is in motion, making it possible for the motorman or other operator to keep sleet, snow, and ice or rain wiped from the window pane giving clearness of vision through said window at all times.

With the above and other objects in view the invention has relation to a certain combination and arrangement of a simplified form of assembly herein disclosed and used in connection with the window to be wiped, an example of which is described in the following specification, pointed out in the appended claim and illustrated in the accompanying drawings; wherein, Figure 1 illustrates a window wiping device shown in connection with a window pane, all shown in elevation.

Fig. 2 illustrates a longitudinal vertical sectional view of the device.

Fig. 3 is a cross sectional view taken horizontally through one of the figures.

Referring now more in particular to the drawings, the usual form of window frame or retaining means is designated by the numeral 1 while 2 points out the window glass or pane mounted in the frame.

A pair of vertically parallel channel members 3 are carried upon each vertical frame member of the pane retaining frame, one channel being placed upon each side of the glass as shown. A pair of slide blocks 4 are placed in the channel members. This arrangement of slide blocks is duplicated in each set of channel members one pair being placed on either side of the pane. An absorbent felt wiper or rubber wiper strip 5 is disposed between the slide blocks 4 and supported by a pair of parallel members 6, said members being secured together by a plurality of screws passed through them and retaining the wiping strip 5. This flexible absorbent wiper strip 5 is placed in a contiguous relation with the window pane all the way across said pane in such a manner as to cause it to be in frictional engagement therewith, said strip projecting beyond the edges of the retaining members 6 as illustrated in cross sectional view. This strip can be easily renewed by the removal of the screws and inserting a new wiper. The members 6 may be mortised in or otherwise permanently fixed to the slide blocks 4, or will preferably be made integral therewith. This assembly as described is duplicated upon each side of the frame and in each pair of channel members. The upper and lower members 1 of the frame are interiorly provided with grooved pulleys 7 which are journaled on pins 8 fixed in the frame. The pulleys are set in hollow spaces formed in the frame. A substantially strong and durable cable or other suitable and flexible cord 9 has connection with each end of the slide block and is passed over each pulley extending along the channeled member and having connection with the other slide block. Each extremity of the slide block is connected with the other slide block by the flexible cable as described in such a manner that when one slide block is moved the other one will move through the pulling action of the cord.

When a window is to be wiped or the ice and snow to be stripped therefrom the operator has merely to subject either one of the wipers 5 to a reciprocating motion passing it up and down along the channel members. This causes the rubber or felt wiper 5 to be rubbed in frictional contact with the glass pane engaging it sufficiently to strip all ice and snow or water therefrom.

The invention is presented to include all such changes and modifications as may come within the scope of the following claim.

Claim—

In a window wiping device, the combination of channel guides of substantially U-shaped cross section adapted to be mounted on the inner edge of the sash frame and abut against the inner and outer surfaces of the glass pane, pulleys placed in alinement with said guides, of slide blocks confined within the channels, a cord connecting the slide blocks and passing over the pulleys, and a wiper extending across the pane to be wiped and carried by the slide blocks.

In testimony whereof I hereunto set my hand.

JOHN G. RANDALL.